United States Patent [19]

Ogura et al.

[11] Patent Number: 5,847,978
[45] Date of Patent: Dec. 8, 1998

[54] PROCESSOR AND CONTROL METHOD FOR PERFORMING PROPER SATURATION OPERATION

[75] Inventors: Satoshi Ogura, Moriguchi; Shinya Miyaji, Hirakata; Nobuo Higaki, Osaka; Masato Suzuki, Toyonaka, all of Japan

[73] Assignee: Matsushita Electric Industrial Co., Ltd., Osaka, Japan

[21] Appl. No.: 721,681

[22] Filed: Sep. 27, 1996

[30] Foreign Application Priority Data

Sep. 29, 1995 [JP] Japan .................................. 7-252737

[51] Int. Cl.⁶ .................................................. G06F 9/302
[52] U.S. Cl. ...................................... 364/745.03; 395/562
[58] Field of Search .................... 364/745.03, 748.04, 364/737; 395/562, 563

[56] References Cited

U.S. PATENT DOCUMENTS

| | | | |
|---|---|---|---|
| 5,251,166 | 10/1993 | Ishida | 364/745.03 |
| 5,402,368 | 3/1995 | Yamada et al. | 364/745.03 |
| 5,448,509 | 9/1995 | Lee et al. | 364/737 |
| 5,504,697 | 4/1996 | Ishida | 364/745.03 |
| 5,508,951 | 4/1996 | Ishikawa | 364/745.03 |

FOREIGN PATENT DOCUMENTS

| | | |
|---|---|---|
| 657804 | 6/1995 | European Pat. Off. . |
| 5856032 | 9/1981 | Japan . |
| 7210368 | 8/1995 | Japan . |

*Primary Examiner*—David H. Malzahn
*Attorney, Agent, or Firm*—Price Gess & Ubell

[57] ABSTRACT

A processor including an arithmetic operation circuit and a saturation operation correction circuit both of which are connected in parallel to a register and a data bus and are activated by respective operation instructions. The saturation operation correction circuit judges whether an output from a register file exceeds either of a predetermined upper-most value and a predetermined lower-most value, and selectively outputs one of an operation result, the upper-most value, and the lower-most value.

16 Claims, 16 Drawing Sheets

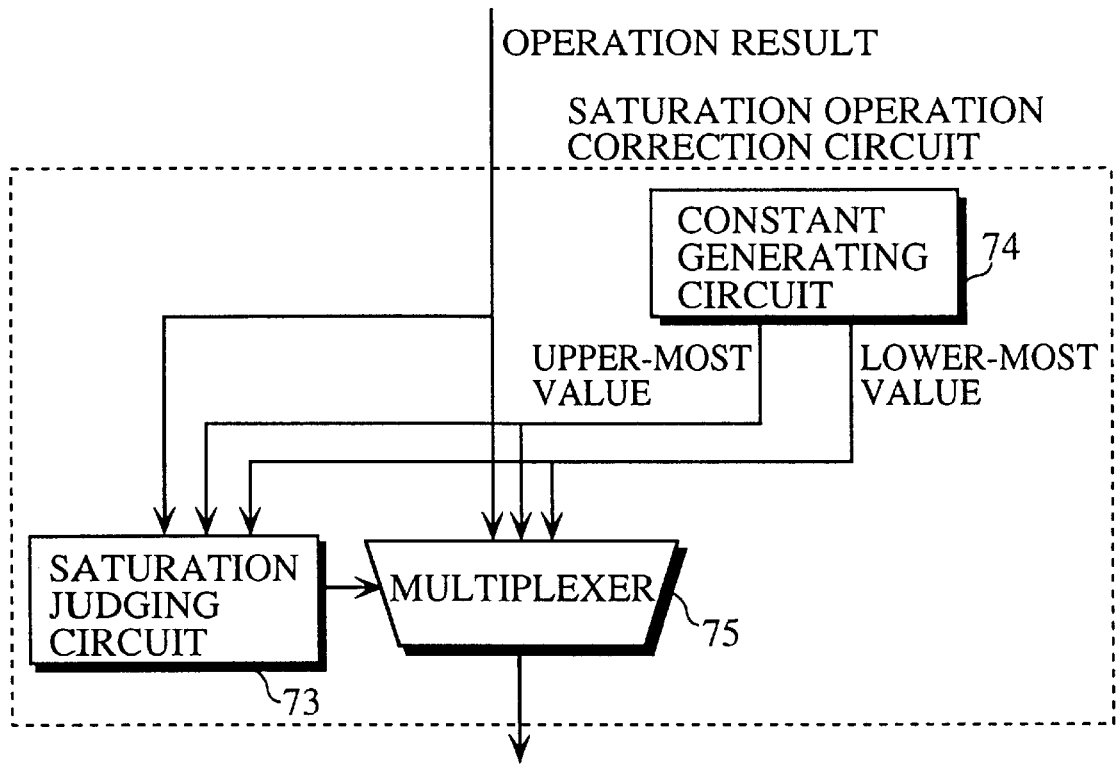

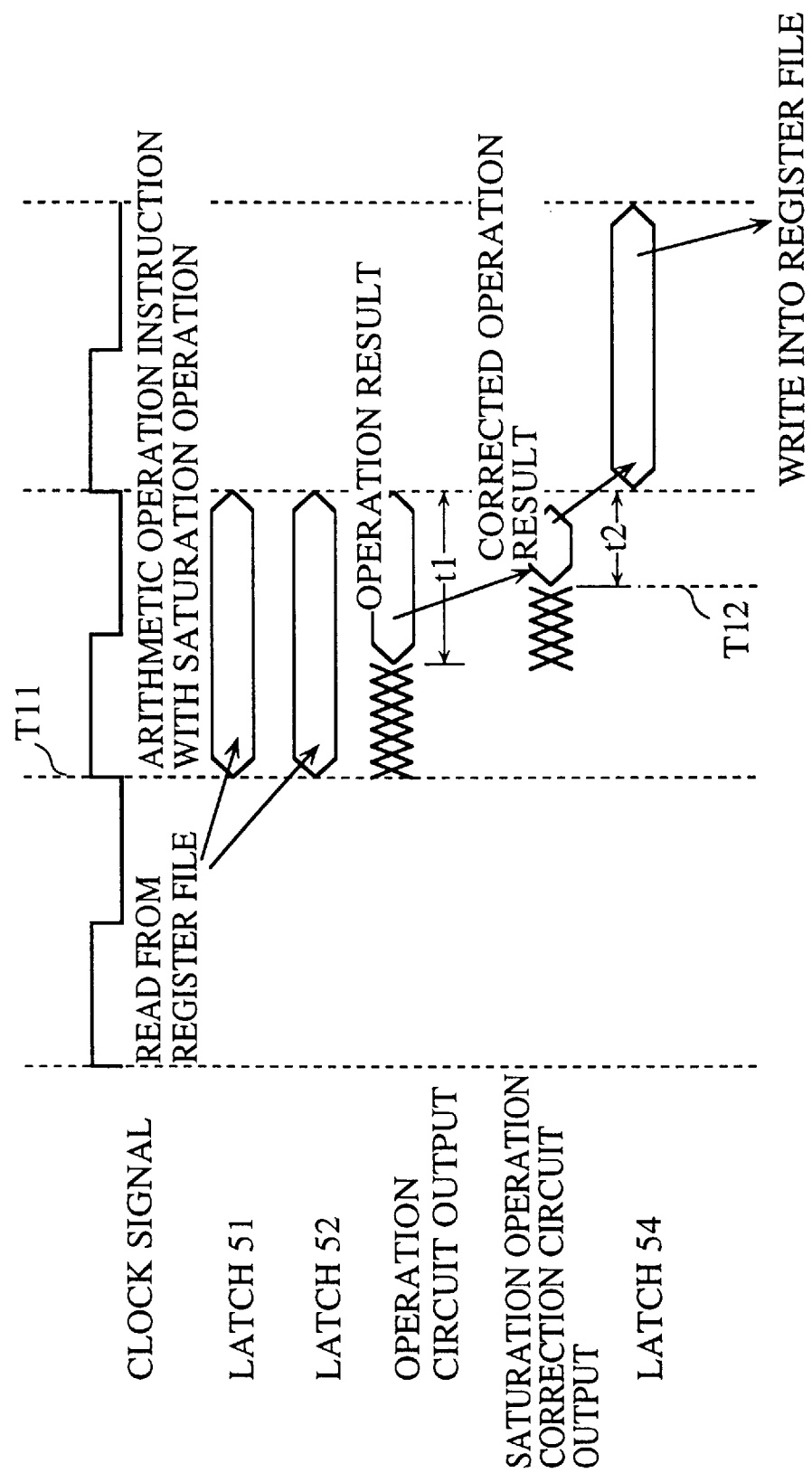

FIG. 9

| x | y | OUTPUT |
|---|---|--------|
| 0 | 0 | c ( OPERATION RESULT ) |
| 1 | 0 | b ( UPPER-MOST VALUE ) |
| 0 | 1 | a ( LOWER-MOST VALUE ) |

| | ARITHMETIC OPERATION INSTRUCTION | 16-BIT SATURATION OPERATION INSTRUCTION | 24-BIT SATURATION OPERATION INSTRUCTION |
|---|---|---|---|
| ADDITION INSTRUCTION | ADD D0,D1<br>ADD imm,D0 | | |
| SUBTRACTION INSTRUCTION | SUB D0,D1<br>SUB imm,D0 | | |
| MULTIPLICATION INSTRUCTION | MUL D0,D1<br>MUL imm,D0 | | |
| SATURATION OPERATION INSTRUCTION | | SAT16 D0 | SAT24 D0 |

FIG. 16

| V | C | N | VX | CX | NX | VY | CY | NY | IM2 | IM1 | IM0 | IE |

FIG. 18

| FLAG V | FLAG N | OUTPUT |
|---|---|---|
| 1 | 0 | UPPER-MOST VALUE |
| 1 | 1 | LOWER-MOST VALUE |
| 0 | 0 | OPERATION RESULT |
| 0 | 1 | OPERATION RESULT |

PROCESSOR AND CONTROL METHOD FOR PERFORMING PROPER SATURATION OPERATION

BACKGROUND OF THE INVENTION (1) Field of the Invention

The present invention relates to a processor used in computers, particularly to an improved saturation operation.

(2) Description of the Prior Art

The saturation operation is used in various fields such as graphics processing and servo control. The saturation operation is performed as follows: first it is judged whether an operation result exceeds a predetermined value range; then, if exceeds, the operation result is corrected.

Such a saturation operation is required to prevent incorrect reversions of positive sign to negative sign and vice versa and incorrect operation results with much difference from theoretical values, both being generated by carries. When integers are calculated, the Most Significant Bit (MSB) is used to represent plus/minus sign. For example, when 16-bit integers are calculated, the 16th bit, namely the MSB, is used at a "sign bit." The operation is performed properly as far as the result reaches the 15th bit or less. However, when the result reaches the 16th bit, the sign reversion happens. For example, "positive integer+positive integer" may result in a "negative integer."

The above sign reversion can be detected by checking whether the sign bit changes. When 16-bit integers are calculated by a 32-bit calculator, it is expected that the 16th bit is assigned to the sign bit and that the 17th bit to 32nd bit do not change. In this case, the upper-most value is a 32-bit integer 0x00007FFF with a sign and the lower-most value a 32-bit integer 0xFFFF8000 with a sign ("0x" indicates hexadecimal notation). If an operation result output exceeds the range from the upper-most value to the lower-most value, it is considered that the result is not represented by a 16-bit value. Note that in the present specification, if the result exceeds the range, it is described as "the result is saturated," and if the result does not exceed the range, "the result is not saturated."

The following are two conventional methods for achieving such saturation operations.

The first conventional method has a correction routine after an operation instruction. Now, the first conventional method is explained by taking a look at an example of a correction routine. Note that in the example shown below, it is assumed that register D1 stores the operation result. Also note that each instruction used in the correction routine includes two operands. The left operand is called the first operand, and the right operand the second operand. The second operand specifies a target to which a value is transferred and also specifies a target into which the operation result is stored.

instruction 1: CMP upper-most value,D1
  instruction 2: BCS NOT_CARRY
  instruction 3: MOV upper-most value,D1
  instruction 4: BRA END
NOT_CARRY
  instruction 5: CMP lower-most value,D1
  instruction 6: BCC END
  instruction 7: MOV lower-most value,D1
    END:

Instruction 1 compares the upper-most value with a value in register D1. The comparison is performed by subtracting the immediate value being the upper-most value (first operand) from the register D1 value (second operand). If the register D1 value is smaller than the upper-most value, the carry flag is set and instruction 2 is executed. If the register D1 value is greater than the upper-most value, instruction 3 is executed.

Instruction 2 executes a branch to a label "NOT_CARRY" because the carry flag is set, where "B" in "BCS" stands for "branch" and "CS" "carry set."

Instruction 3 transfers the upper-most value to register D1 to correct the operation result, that is, replace the register D1 value by the upper-most value. After the correction, instruction 4 executes a branch to a label "END" and the saturation operation ends.

If the register D1 value is greater than the upper-most value, instruction 2 is executed and the control branches to a label "NOT_CARRY." Instruction 5 compares the register D1 value with the lower-most value. The comparison is performed by subtracting the immediate value being the lower-most value (first operand) from the register D1 value (second operand). If the register D1 value is smaller than the lower-most value, the carry flag is set.

Instruction 6 executes a branch to a label "END" if the carry flag is reset since it means that the register D1 value is greater than the lower-most value, where "CC" in "BCC END" stands for "carry clear."

If the carry flag is set, instruction 6 does not execute a branch and instruction 7 is executed. Instruction 7 transfers the lower-most value to register D1 to correct the operation result, that is, replace the register D1 value by the lower-most value. After the correction, the saturation operation ends The saturation operation using the correction routine has been described as above. One of the problems of the first conventional technique is the great number of codes required for the saturation operations. In the above example, one saturation operation includes seven instructions. In case the program is pre-loaded in ROMs, this increases the data amount in ROMs considerably, raising the production cost. The great number of codes also cause a problem in term of the execution time. In case of the correction routine in the above example which includes branch instructions (instructions 2, 4, and 6), at least a branch is executed whenever the correction routine is executed, regardless of whether the result is saturated. This decreases the processing efficiency of the pipeline processing.

Japanese laid-open patent application no.7-210368 discloses a technique for reducing the number of codes and improving the execution speed by setting a dedicated circuit in the processor. The technique disclosed in the above patent application is described below as the second conventional technique.

FIG. 1 shows the construction of the processor used in the second conventional technique. The construction is almost the same as that of previous conventional techniques in that the processor includes latch circuits 51, 52, 53, and 54, register file 71 for storing operation data and an operation result and for outputting the result according to the decoded instruction, and arithmetic operation circuit 72 for performing a calculation using the value output from register file 71.

The saturation-exclusive circuit is saturation operation correction circuit 70 which is located between the output of arithmetic operation circuit 72 and data bus.

FIG. 2 shows the construction of saturation operation correction circuit 70. As shown in the drawing, saturation operation correction circuit 70 includes saturation judging circuit 73 for judging whether the operation result output from arithmetic operation circuit 72 is saturated, constant generating circuit 74 for generating the upper-most value and lower-most value which are used for the judgement, and multiplexer 75 for selectively outputting any of the operation result output from arithmetic operation circuit 72, the upper-most value, and the lower-most value output from constant generating circuit 74. With such a construction, if latch circuit 51 holds the operation result of arithmetic operation circuit 72, saturation judging circuit 73 judges whether the operation result is saturated. If saturated, either of the upper-most value and the lower-most value is output instead of the operation result.

FIG. 3 shows a list of instructions set in the processor for activating saturation operation correction circuit 70. Among these instructions, "ADD D0,D1," "SUB D0,D1," and "MUL D0,D1" are general instructions, and "ADDS16 D0,D1," "SUBS16 D0,D1," "MULS16 D0,D1," "ADDS24 D0,D1," "SUBS24 D0,D1," and "MULS24 D0,D1" are prepared for saturation operation correction circuit 70.

"ADDS16 D0,D1," "SUBS16 D0,D1, " and "MULS16 D0,D1," are arithmetic operation instructions with a saturation operation which instruct arithmetic operation circuit 72 to perform respectively addition, subtraction, and multiplication operations, then instruct saturation operation correction circuit 70 to perform a 16-bit saturation operation using the result. "ADDS24 D0,D1," "SUBS24 D0,D1," and "MULS24 D0,D1" are arithmetic operation instructions with a saturation operation which instruct arithmetic operation circuit 72 to perform respectively addition, subtraction, and multiplication operations, then instruct saturation operation correction circuit 70 to perform a 24-bit saturation operation using the result.

For example, instruction "ADDS16 D0,D1" instructs arithmetic operation circuit 72 to perform an addition operation in which register D0 value is added to register D1 value, then instructs saturation operation correction circuit 70 to perform a 16-bit saturation operation using the result. Instruction "SUBS16 D0,D1" instructs arithmetic operation circuit 72 to perform a subtraction operation using register D0 value and register D1 value, then instructs saturation operation correction circuit 70 to perform a 16-bit saturation operation using the result.

While the first conventional technique requires seven instructions including several branch instructions in a saturation operation, the second conventional technique uses only one instruction selected from the list shown in FIG. 3 to allow the processor to perform a calculation and a saturation operation using the calculation result. Accordingly, the second conventional technique reduces the number of codes largely compared to the first conventional technique since only one instruction is enough to instruct the processor to perform a calculation and a saturation operation using the calculation result.

Now, the operation of the processor with such a construction is described in detail with reference to a timing chart shown in FIG. 4.

When an operation instruction is decoded, latch circuits 51 and 52 hold a value stored in register file 71 at timing T11. Arithmetic operation circuit 72 performs an operation using the values held by latch circuits 51 and 52, and outputs the result at timing T11.

At timing T12, saturation judging circuit 73 judges whether the result exceeds the upper-most value or the lower-most value by comparing the result with the upper-most value or the lower-most value generated by constant generating circuit 74. Based on the judgement made by saturation judging circuit 73, multiplexer 75 selects the upper-most value if the result is greater than the upper-most value, and selects the lower-most value if smaller than the lower-most value. Multiplexer 75 selects and outputs the result if the result is equal to or smaller than the upper-most value or if the result is equal to or greater than the lower-most value.

The output from multiplexer 75 is stored in register tile 71 as the operation result. Note that for general operation instructions, multiplexer 75 selects and outputs an operation result regardless of the judgement.

In the second conventional technique, saturation operation correction circuit 70 is set between the output of arithmetic operation circuit 72 and data bus in order to activate a calculation and a saturation operation using the calculation result by executing one instruction. With such a construction, when transferred from arithmetic operation circuit 72 to register file 71, the data must go through saturation operation correction circuit 70. This is the same even when general operation instructions are executed.

Generally, a path connecting data register, arithmetic operation circuit, and register file is called a critical path. The data transfer time taken at the critical path affects the machine cycle of the processor. In the second conventional technique, saturation operation correction circuit 70 is set in the middle of the critical path for executing a saturation operation with one instruction. With such a construction, the machine cycle of the processor is determined based on T1+T2, where T1 represents time taken by arithmetic operation circuit 72 for a calculation and T2 time taken by saturation judging circuit 73 for a calculation.

Accordingly, it is possible to say that one of the problems of the second conventional technique is a limit set to the process speed. When the machine cycle is determined based on T1+T2, the clock signal cycle should be equal to or greater than T1+T2. This limits the process speed of the processor. That means the second conventional technique sacrifices the processor speed to decrease the number of codes stored in ROMs.

Also, another problem of the second conventional technique is the increased number of instructions, operation instructions with saturation operation such as "ADDS24 D0,D1," "SUBS24 D0,D1," and "MULS24 D0,D1" have newly been added. The number of newly added instructions equals to the number of operation instruction types multiplied by the number of bit length types for saturation processing. The increase in the number of instructions makes the instruction decoder and control circuit complicated.

SUMMARY OF THE INVENTION

It is therefore the first object of the present invention to provide a processor which does not sacrifice the processor speed to decrease the number of codes stored in ROMs and at the same time performs an operation and a saturation operation with the result of the operation with a suitable number of codes and a suitable speed.

It is the second object of the present invention to provide a processor which prevents the instruction decoder and control circuit from becoming complicated and at the same time performs an operation and a saturation operation with the result of the operation with a suitable number of codes and a suitable speed.

The above objects are fulfilled by a processor comprising: decoding means for decoding an instruction which includes a reading target, an operation, and a storage target, wherein a value is read from the reading target and the operation is performed with the value and a result of the operation is stored in the storage target; first data transferring means for transferring the value from the reading target according to the instruction; operating means for performing the operation with the value according to the instruction; and second data transferring means for transferring the result of the operation to the storage target according to the instruction, wherein the instruction decoded by the decoding meant includes a first instruction including a first operation and a second instruction including a second operation, end wherein the operating means includes: calculating means for performing a calculation with the value and outputting a result of the calculation; and saturation operation means for judging whether the value exceeds a predetermined range and outputting a predetermined value if the value exceeds the predetermined range and outputting the value if the value does not exceed the predetermined range, wherein the second data transferring means transfers either of the predetermined range and the value output by the saturation operation means to the storage target.

With such a construction, storage of the operation result by the operating means into a register does not cause a delay even if the saturation operation is performed. This is because the saturation operation is not connected to the output stage of the operating means. Since the operating means and the saturation operation means are connected in parallel to the critical path, the clock signal cycle can be determined based on either longer one of times T3 and T4, where time T3 represents the time period during which arithmetic operation circuit 2 performs an operation and stores the result in the register, and time T4 the time period during which saturation operation correction circuit 3 performs an operation and stores the result in the register (see FIG. 13). Therefore, implementation of saturation operation means does not sacrifice the processor speed.

Also, since the operating means and the saturation operation means are connected in parallel to the first data transferring means and the second data transferring means, the operating means and the saturation operation means can be activated with respective different instructions.

Since the operating means and the saturation operation means are activated with respective different instructions, the number of instructions can be reduced considerably compared to the case where an operation instruction extended with the saturation operation function is newly defined for each type of the operation instruction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows the construction of a conventional saturation operation correction circuit 70;

FIG. 3 is a list of instructions required in the conventional processor with three kinds of operation instructions with two kinds of addressing modes for achieving 16-bit and 24-bit saturation operations;

FIG. 4 shows a timing chart for the conventional processor with saturation operation function;

FIG. 9 is the truth table showing the operation of multiplexer 24;

FIG. 16 shows the construction of state register 9;

FIG. 18 is the truth table showing the operation of multiplexer 85.

DESCRIPTION OF THE PREFERRED EMBODIMENT

<First Embodiment>

Figure 1:
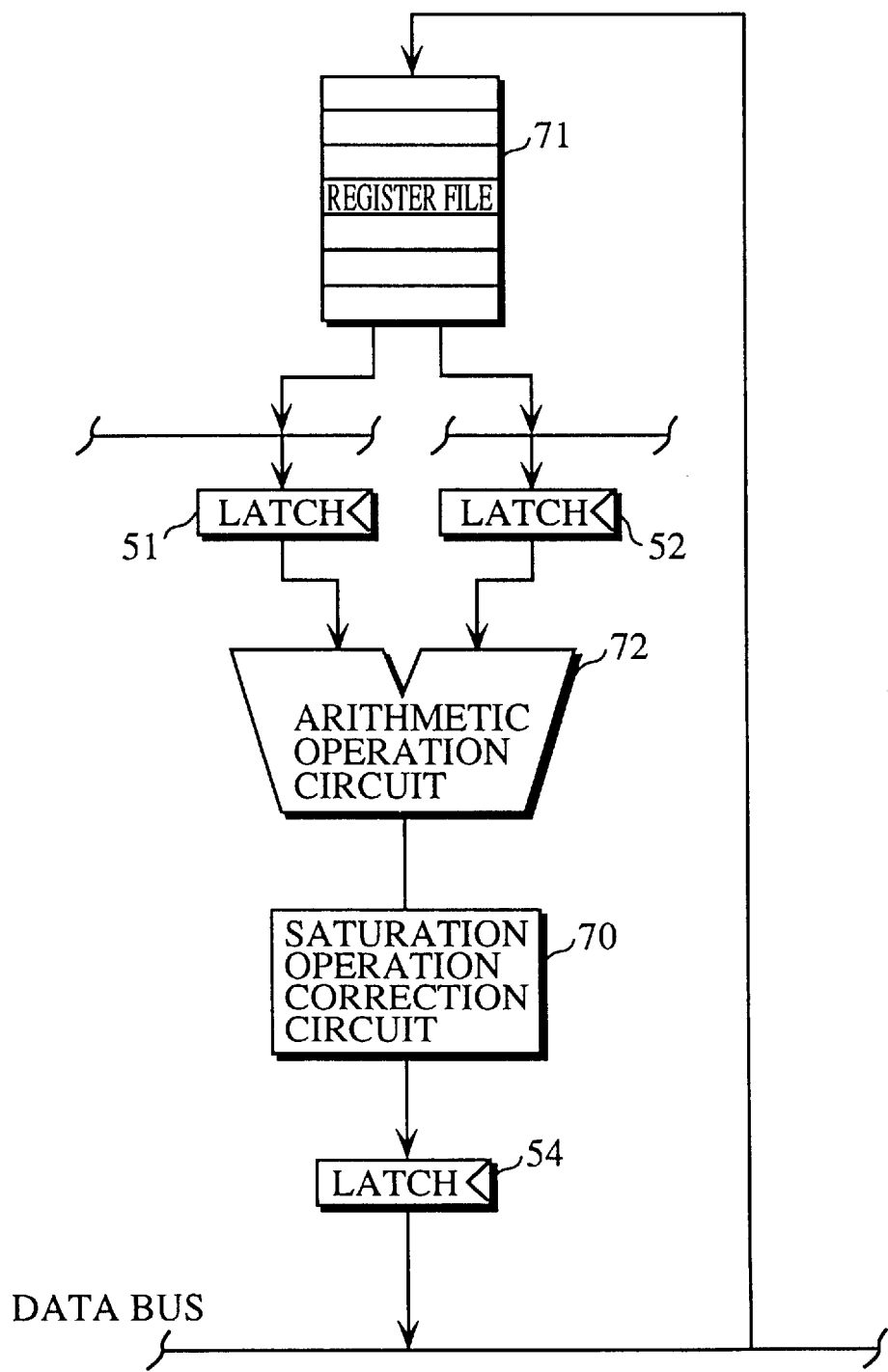
FIG. 1 shows the construction of a conventional processor having saturation operation function.
Figure 5:
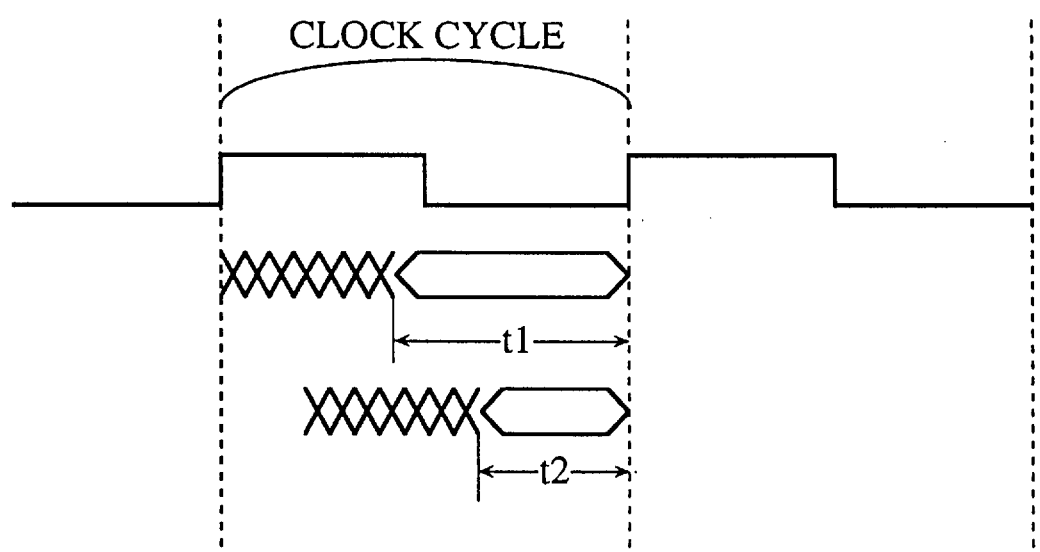
FIG. 5 shows the conventional intervals from which clock signal cycle is determined.
Figure 6:
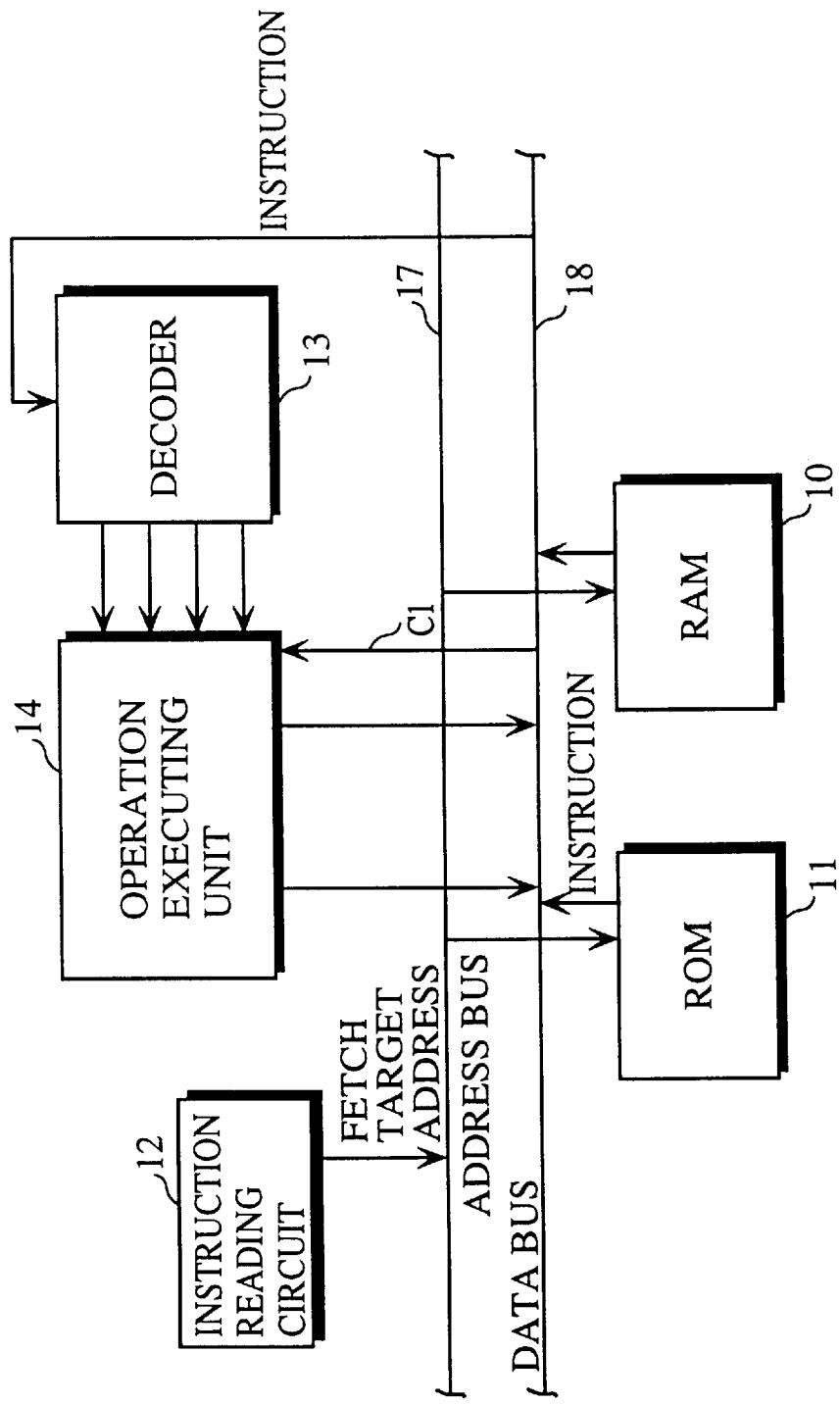
FIG. 6 shows the construction of the processor with saturation operation function described in the first embodiment.

The first embodiment of the present invention is described with reference to the drawings. FIG. 6 shows the construction of the processor used in the first embodiment. As shown in the drawing, the processor includes RAM 10, ROM 11, instruction reading circuit 12, decoder 13, operation executing unit 14, address bus 17, and data bus 18.

RAM 10 stores data to be transferred to data bus 18. The data in stored at a location in RAM 10 specified by a write target address when the write target address is output to address bus 17. When a read target address is output to address bus 17, data stored at a location specified by the read target address is output from RAM 10 to data bus 18.

ROM 11 prestores instructions. If a read target address is output to the address bus, an instruction at the read target address is output from ROM 11 to the data bus. ROM 11 prestores transfer instructions, operation instructions, and branch instructions. The operation instruction is classified into arithmetic operation instructions, logical operation instructions, bit operation instructions, and saturation operation instructions. For example, the mnemonic representation of the arithmetic operation instructions is shown in FIG. 10.

Figures 10, 11:
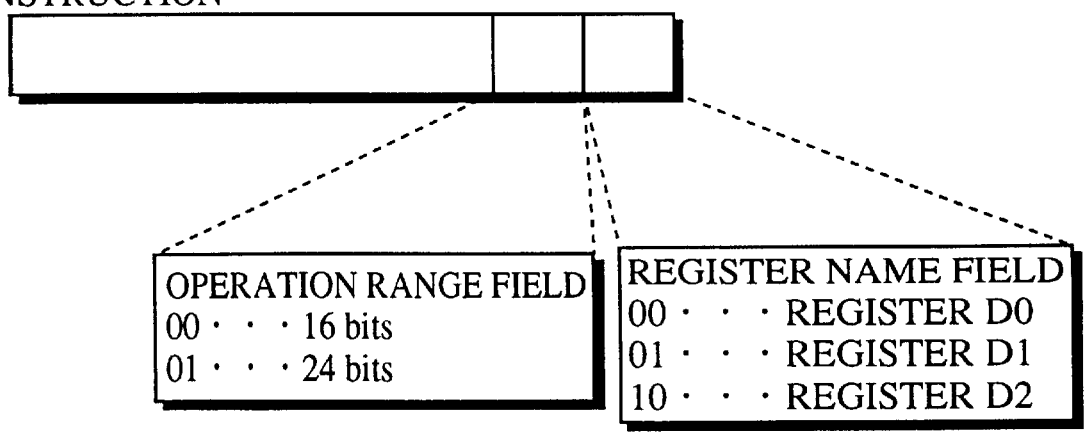
FIG. 10 is a list of three kinds of arithmetic operation instructions with two kinds of addressing modes and the saturation operation instruction specifying 16 bits or 24 bits used in the first embodiment.
FIG. 11 shows the format of the saturation operation instruction.
Figure 12:
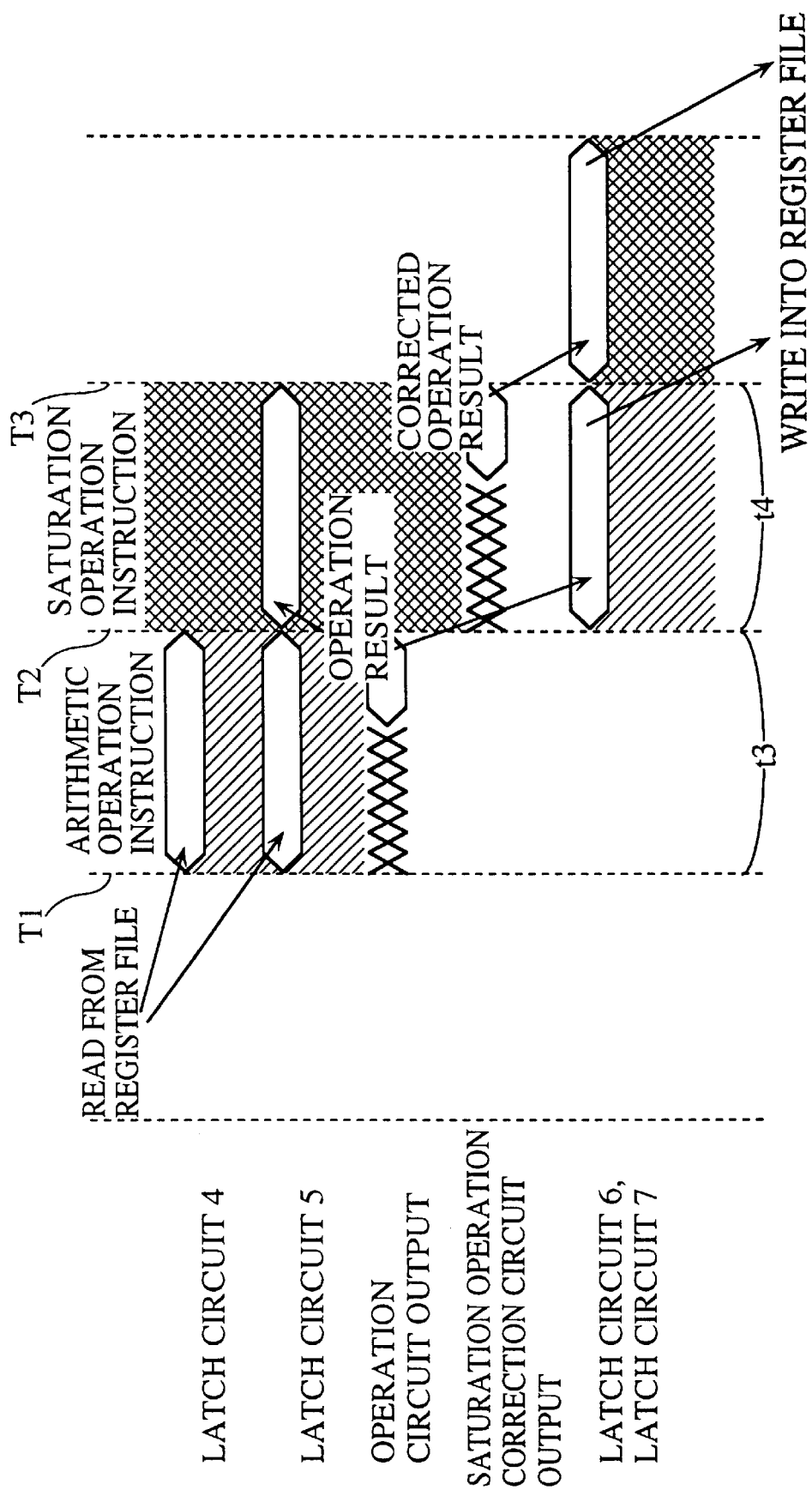
FIG. 12 shows a timing chart for the processor with saturation operation function described in the first embodiment.
Figure 13:
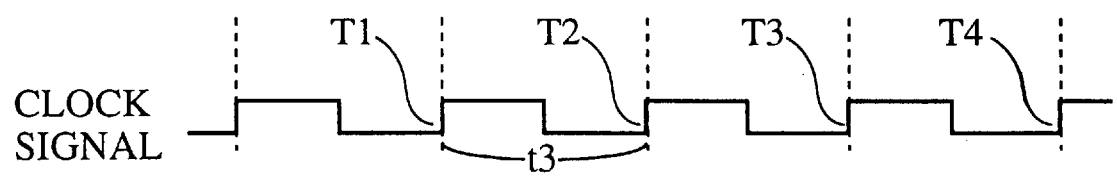
FIG. 13 shows the intervals from which clock signal cycle is determined in the first embodiment.

As shown in FIG. 10, each arithmetic operation instruction such as addition instruction, subtraction instruction, and multiplication instruction includes the first and second operands. Two kinds of addressing modes, namely immediate value specification and direct register specification, are available for the first operand. On the other hand, only direct register specification is available for the second operand since the second operand is also used to specify a storage target of an operation result.

For example, the first and second operands of addition instruction "ADD D0,D1" are respectively register D0 and register D1. For addition instruction "ADD imm,D1," the first and second operands are respectively immediate value "imm" and register D1. The second operand specifies the storage target of the operation result. As a result, in case of addition instruction "ADD D0,D1," the addition result of the registers D0 and D1 values is stored in register D1.

The saturation operation instruction includes register name field and operation range field. The saturation operation instruction judges whether the value stored in the register specified by the register name field exceeds the range specified by the operation range field. If exceeds, the value stored in the register is replaced by the upper-most value or the lower-most value. If not, the value stored in the register is output as it is.

Each of the register name field and operation range field has two bits. FIG. 11 shows the format of the saturation operation instruction. Saturation operation range "00" specifies "16 bits," and "01" 24 bits, Register name field "00" specifies register D0 as saturation operation target, and "01" register D1. The mnemonic representation of the saturation operation instruction is shown at the bottom of FIG. 10. The saturation operation instruction includes either of two kinds of operation codes, "SAT16" and "SAT24," and either of two register names "D0" and "D1."

The characteristics of the instructions stored in ROM 11 have been described. Note that there are some rules between arithmetic operation instructions and saturation operation instructions. The rules are: (1) saturation operation instructions are written immediately after arithmetic operation instructions; and (2) the register name field of the saturation operation instruction and the second operand of the arithmetic operation instruction have the same register name. The following are the examples.

EXAMPLE 1 instruction 1: ADD D0,D1
instruction 2: SAT16 D1

EXAMPLE 2 instruction 3: SUB D0,D1
instruction 4: SAT24 D1

The following is the description of the above rules. Since the second operand of the arithmetic operation instruction specifies a register in which the operation result is stored, the saturation operation instruction written immediately after the arithmetic operation instruction judges whether the register value exceeds the specified range and performs a necessary correction if the same register name is specified in the register name field of the saturation operation instruction.

In case of the above example 1, the addition result of register D0 and D1 values is stored in register D1, and the value is used by the next saturation operation instruction. In case of the example 2, the subtraction result of register D0 and D1 values is stored in register D1, and the value is used by the next saturation operation instruction.

Instruction reading circuit 12 includes a program counter for generating read target addresses sequentially and outputting them to the address bus. Instruction reading circuit 12 reads instructions output from ROM 11 to the data bus and outputs them to decoder 13.

Decoder 13 includes an instruction buffer and an instruction register. The instruction buffer stores a plurality of instructions read from the data bus. The instruction register stores a decode target instruction among the instructions stored in the instruction buffer. Decoder 13 decodes the instruction stored in the instruction register and instructs operation executing unit 14 to execute the instruction. The instruction can be executed under various kinds of controls. Here, three kinds of controls are described; register output control (hereinafter control (1)), operation execution control (hereinafter control (2), and constant generation control (hereinafter control (3)).

Under control (1), decoder 13 instructs operation executing unit 14 to output the first and second operands of the arithmetic operation instruction read by instruction reading circuit 12 or to output the value stored in a register specified in the register name field of the saturation operation instruction read by instruction reading circuit 12. Under control (2), decoder 13 instructs operation executing unit 14 to execute the operation specified by the operation instruction. Under control (3), decoder 13 instructs operation executing unit 14 to generate the upper-most value and lower-most value of the operation range specified by the saturation operation instruction. The controls (1) and (2) are performed after decoder 13 decodes an arithmetic operation instruction. The controls (1) and (3) are performed after decoder 13 decodes a saturation operation instruction. The control (2) is generated immediately after the arithmetic operation instruction is decoded and control (3) is generated immediately after the saturation operation instruction is decoded. Therefore, controls (2) and (3) exclude from each other.

Address bus 17 transfers read target addresses output from instruction reading circuit 12.

Data bus 18 transfers data output from RAM 10 to register file 1 and internal bus 15 through control lines c1 and c2.

Figure 7:
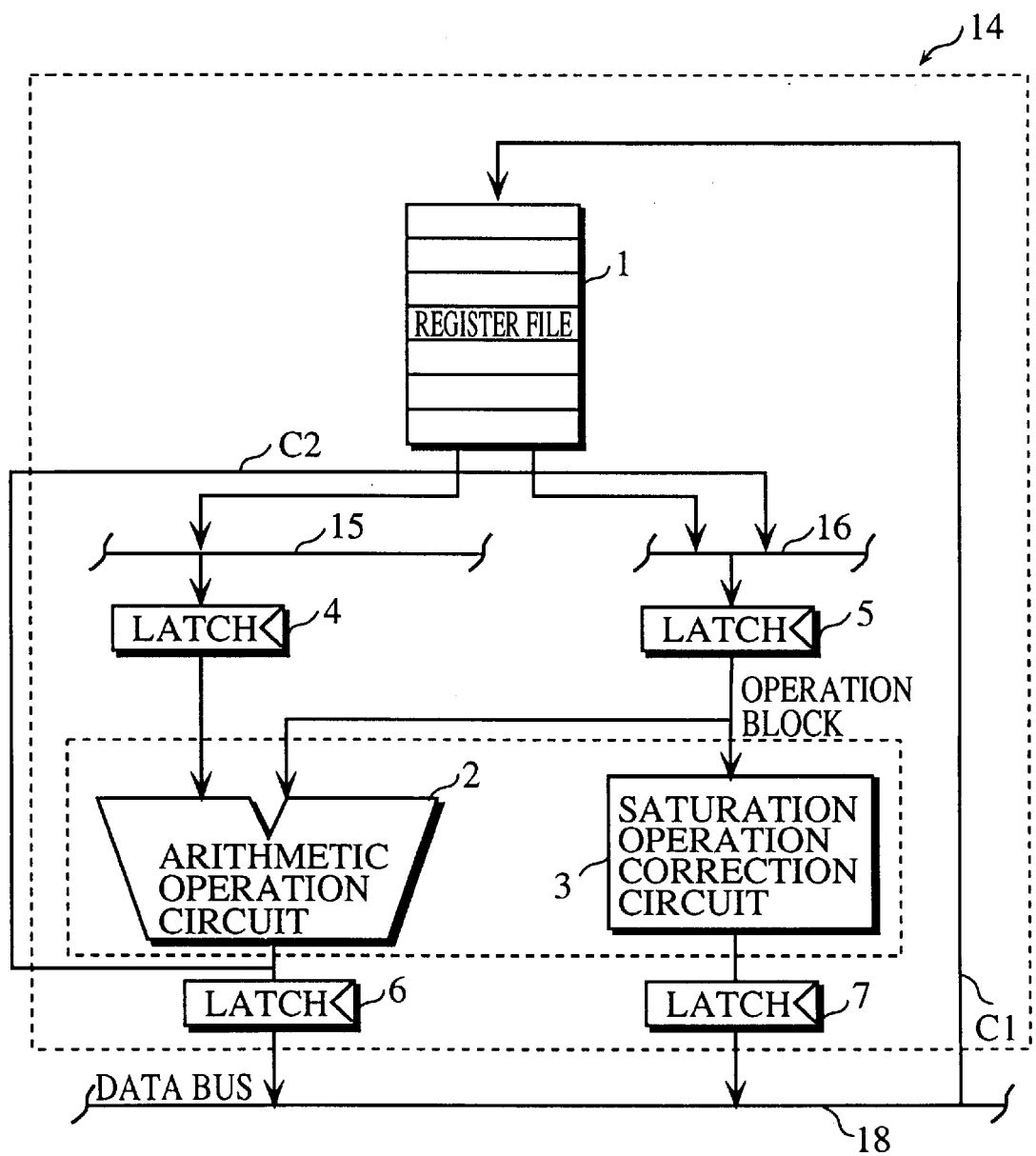
FIG. 7 shows the construction of operation executing unit 14 described in the first embodiment.

FIG. 7 shows the construction of operation executing unit 14. As shown in the drawing, operation executing unit 14 includes register file 1, arithmetic operation circuit 2, saturation operation correction circuit 3, latch circuit 4, latch circuit 5, latch circuit 6, latch circuit 7, internal bus 15, and internal bus 16. Although many control signal lines for controls (1), (2), and (3) are set between the above elements and decoder 13, the lines are not shown in the drawing for the sake of simplification.

Register file 1 includes 32-bit data registers D0, D1, and D2. After one or two register names are specified by decoder 13 under control (1), register file 1 outputs the values stored in the specified registers. Also, register file 1 receives a value from data bus 18 through path c1 and holds the value.

First internal bus 15 transfers a value output by register file 1.

Second internal bus 16 transfers a value output by register file 1 and also transfers date output by arithmetic operation circuit 2 through path c2.

Latch circuit 4 holds the value transferred by first internal bus 15.

Latch circuit 5 holds the value and data read from RAM 10 both transferred by second internal bus 16.

Latch circuit 6 holds the operation result output from arithmetic operation circuit 2 and outputs the result to the data bus.

Latch circuit 7 holds the operation result output from saturation operation circuit 3 and outputs the result to the data bus.

Arithmetic operation circuit 2 includes a 32-bit full adder, a multiplication unit, and a parallel shifter. Arithmetic operation circuit 2 performs operations under control (2) by decoder 13. Since the input stage of arithmetic operation circuit 2 is connected to the output stages of latch circuits 4 and 5, the operation under control (2) is performed by using a register value held in latch circuit 4 and a register value held in latch circuit 5.

Also, since the output stage of arithmetic operation circuit 2 is connected to the input stage of latch circuit 6, the operation result output under control (2) is held by latch circuit 6 as soon as it is output and output to the data bus.

For example, if an addition is performed under control (2), arithmetic operation circuit 2 adds a value hold by latch circuit 4 to a value held by latch circuit 5 and outputs the addition result. Also, if a subtraction is performed under control (2), arithmetic operation circuit 2 subtracts a value held by latch circuit 5 from a value held by latch circuit 4 and outputs the subtraction result.

Saturation operation correction circuit 3 performs a saturation operation under control (3). Since the input stage of saturation operation correction circuit 3 is connected to the output stage of latch circuit 5, the saturation operation under control (3) is performed by using a register value held in latch circuit 5.

Also since the output stage of saturation operation correction circuit 3 is connected to the input stage of latch circuit 7, the operation result output under control (3) is held by latch circuit 7 as soon as it is output and output to the data bus. Note that though not shown in the drawings, there is a buffer which stores e value output from saturation operation correction circuit 3. The buffer stores the value under control for either SAT16 or SAT24.

It is worthy of attention that while arithmetic operation circuit 2 Is connected to register file 1 and the data bus via latch circuits 4, 5, and 6, saturation operation correction circuit 3 is connected to the same via latch circuits 5 and 7. This means that arithmetic operation circuit 2 and saturation operation correction circuit 3 are connected in parallel to register file 1 and the data bus. Arithmetic operation circuit 2 and saturation operation correction circuit 3 connected in parallel as above can be regarded as a block which is activated by each instruction, or operation, such as "ADD," "SUB," "MUL," and "SAT." Therefore, they are called an "operation block" in the drawings. This further means that arithmetic operation circuit 2 and saturation operation correction circuit 3 are connected in parallel to the critical path since a path connecting a register file and the data bus is generally called the critical path as mentioned earlier.

Arithmetic operation circuit 2 and saturation operation correction circuit 3 are connected in parallel since controls (2) and (3) exclude from each other and either of them need not be activated while the other is activated.

Figure 8:
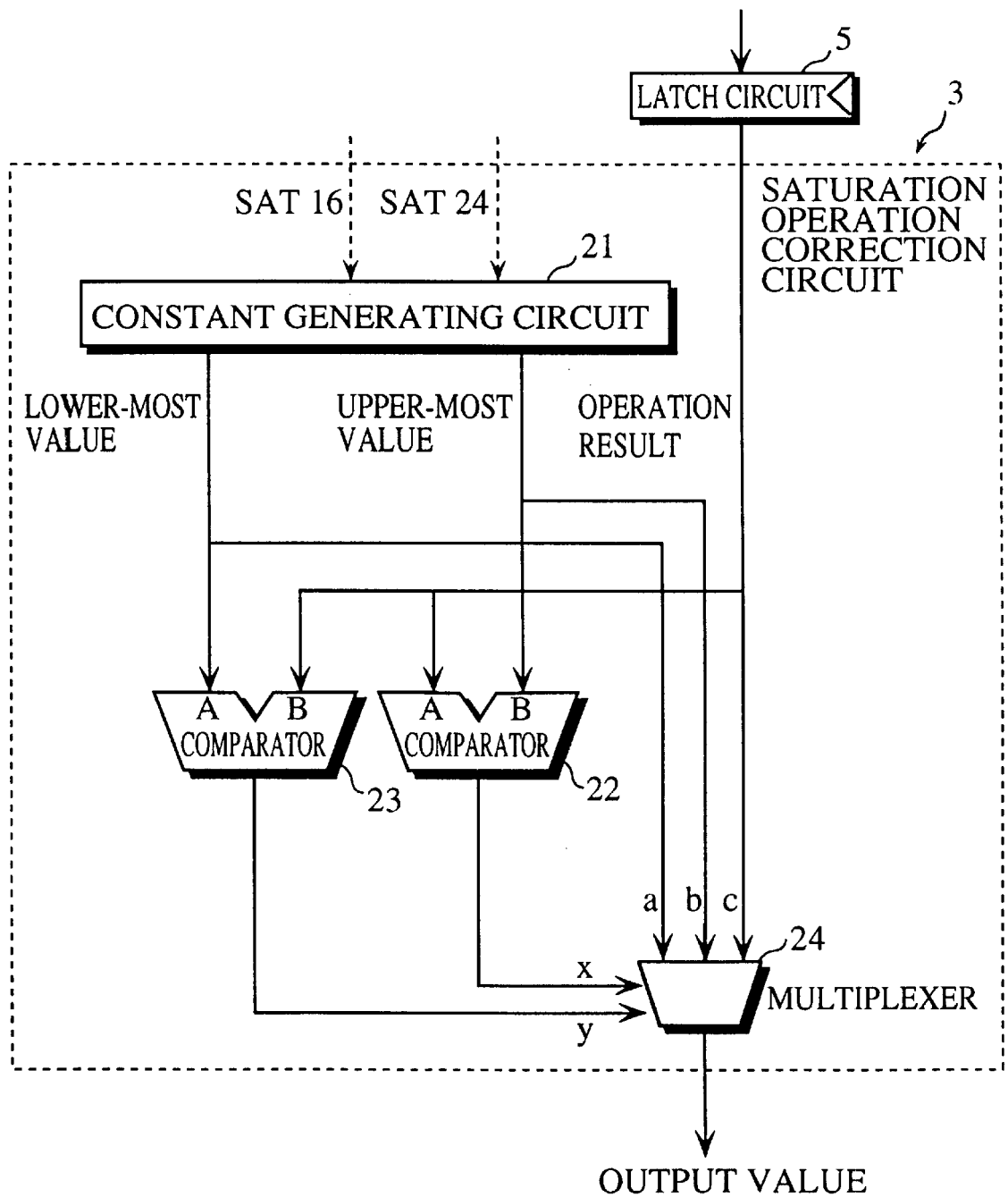
FIG. 8 shows the construction of saturation operation correction circuit 3 described in the first embodiment.

FIG. 8 shows the construction of saturation operation correction circuit 3. As shown in FIG. 8, saturation operation correction circuit 3 is made up of constant generating circuit 21, comparator 22, comparator 23, and multiplexer 24. Although many control lines ere set between the above elements and decoder 13, the lines are not shown in the drawing for the sake of simplification.

Constant generating circuit 21 generates the upper-most value and lower-most value of the operation range. The operation range is specified in the operation range field of instructions "SAT16 D0" and "SAT24 D0" under control (3) and given by decoder 13. More specifically, if the decode result output from decoder 13 is "SAT16 D0," constant generating circuit 21 generates a 32-bit integer with a sign 0x00007FFF as the upper-most value for 16-bit operations and outputs the value to comparator 22 and multiplexer 24. For the same decode result, constant generating circuit 21 also generates a 32-bit integer with a sign 0xFFFF8000 as the lower-most value for 16-bit operations and outputs the value to comparator 23 and multiplexer 24.

If the decode result output from decoder 13 is "SAT24 D0," constant generating circuit 21 generates 0x007FFFFF as the upper-most value for 24-bit operations and outputs the value to comparator 22, and 0xFF800000 as the lower-most value for 24-bit operations and outputs the value to comparator 23.

Comparator 22 compares a value held in latch circuit 5 with the upper-most value generated by constant generating circuit 21. The comparison is performed by subtracting the upper-most value from the value held in latch circuit 5 and by judging whether the subtraction generates a carry. If the latch circuit value is greater than the upper-most value, logical value "1" is output to multiplexer 24. If the latch circuit value is equal to or smaller than the upper-most value, logical value "0" is output to multiplexer 24.

Comparator 23 compares a value held in latch circuit 5 with the lower-most value generated by constant generating circuit 21. The comparison is performed by subtracting the lower-most value from the latch circuit value and by judging whether the subtraction generates a carry. If the latch circuit value is greater than the lower-most value, logical value "0" is output to multiplexer 24. If the latch circuit value is equal to or smaller than the upper-most value, logical value "1" is output to multiplexer 24.

Multiplexer 24 selectively outputs any of the upper-most value, the lower-most value, and a register-file-1 value held in latch circuit 5 according to the combination of logical values output from comparators 22 and 23.

FIG. 9 is the truth table showing the operation of multiplexer 24. The table shows the relation between the combinations of logical values and the values output from multiplexer 24, where x represents the logical value output from comparator 22 and y the logical value output from comparator 23.

The table shows that if "0" is output from both comparators 22 and 23, multiplexer 24 outputs a value held in latch circuit 5 which is an operation result.

If "1" is output from comparator 22 and "0" from comparator 23, multiplexer 24 outputs the upper-most value generated by constant generating circuit 21. With such an output control by multiplexer 24, the operation result stored in register file 1 is replaced by a corrected value only if the operation result is saturated.

Now, the operation of operation executing unit 14 is described.

(When Operation Result Is Saturated)

Suppose that ROM 11 stores instructions "ADD D0,D1" and "SAT16 D0" in the order, that these instructions are read to decoder 13 via the data bus by instruction reading circuit 12, and that registers D0 and D1 in register file 1 respectively store 0x00001234 and 0x00007654.

Decoder 13 decodes arithmetic operation instruction "ADD D0,D1" at timing T1. Values stored in registers D0 and D1 of register file 1 are output and held by latch circuits 4 and 5. Arithmetic operation circuit 2 adds 0x00001234 of register D0 to 0x00007654 of register D1.

At timing T2, the addition result 0x00008888 is held by latch circuits 5 and 6. The addition result held by latch circuit 6 is output to the data bus. The output value is transferred to register file 1 via path c1 and stored in register D1.

As described above, the addition result is stored in register file 1 at timing T2. Here, the values stored in registers D0 and D1 and the addition result are respectively represented in decimal notation as "4660," "30292," and "−2184."

In other words, the processor has performed an operation "4660+30292=−2184" at timing T2. However, the operation should be performed as "4660+30292=+34952." That means a result with much difference from the theoretical value has been generated and stored in register file 1.

At the same time, at timing T2, decoder 13 decodes saturation operation instruction "SAT16 D0." Constant generating circuit 21 generates the upper-most value 0x00007FFF and the lower-most value 0xFFFF8000. Comparator 22 compares the operation result 0x00008888 held in latch circuit 5 with the upper-most value 0x00007FFF. Comparator 23 compares the operation result 0x00008888 held in latch circuit 5 with the lower-most value 0xFFFF8000.

Since the operation result 0x00008888 is greater than the upper-most value 0x00007FFF, multiplexer 24 selectively outputs the upper-most value 0x00007FFF. The output value is held by latch circuit 7 end output to the data bus. The value is transferred to register file 1 via path o1. As a result, the upper-most value 0x00007FFF overwrites the previous operation result 0x00008888 in register D1 of register file 1. The upper-most value 0x00007FFF is represented in decimal notation as "+32767." Although there is difference between this value and the correct answer "+34952," the current result is much closer to the expected result than the previous result "−2184" is.

(When Operation Result Is Not Saturated)

Suppose that ROM 11 stores instructions "ADD D0,D1" and "SAT16 D0" in the order, that these instruction are read to decoder 13 via the data bus by instruction reading circuit 12, and that registers D0 and D1 in register file 1 respectively store 0x00000234 and 0x00007654.

Decoder 13 decodes arithmetic operation instruction "ADD D0,D1" at timing T1. Values stored in registers D0 and D1 of register file 1 are output end held by latch circuits 4 and 5. Arithmetic operation circuit 2 adds 0x00000234 of register D0 to 0x00007654 of register D1.

At timing T2, the addition result 0x00007888 is held by latch circuits 5 and 6. The addition result 0x00007888 held by latch circuit 6 is output to the data bus. The output value is transferred to register file 1 via path c1 and stored in register D1.

At the same time, at timing T2, decoder 13 decodes saturation operation instruction "SAT16 D0." Constant generating circuit 21 generates the upper-most value 0x00007FFF and the lower-most value 0xFFFF8000. Comparator 22 compares the operation result 0x00007888 held in latch circuit 5 with the upper-most value 0x00007FFF. Comparator 23 compares the operation result 0x00007888 held in latch circuit 5 with the lower-most value 0xFFFF8000.

Since the operation result 0x00007888 is smaller than the upper-most value 0x00007FFF and greater than the lower-most value 0xFFFF8000, multiplexer 24 outputs the operation result 0x00007888 held in latch circuit 5 to the data bus.

As understood from the above description, the saturation operation process generates no delay in storing the operation result in a register. This is because arithmetic operation circuit 2 is not set at a place between the output stage of saturation operation correction circuit 3 and the register. Since arithmetic operation circuit 2 and saturation operation correction circuit 3 are connected in parallel to the critical path, the clock signal cycle can be determined based on either longer one of times T3 and T4, where time T3 represents the time period during which arithmetic operation circuit 2 performs an operation and stores the result in the register, and time T4 the time period during which saturation operation correction circuit 3 performs an operation and stores the result in the register. Therefore, implementation of saturation operation correction circuit 3 does not sacrifice the processor speed.

Also, since arithmetic operation circuit 2 and saturation operation correction circuit 3 are connected in parallel to registers and data bus, instructions for controlling arithmetic operation circuit 2 and instructions controlling saturation operation correction circuit 3 can be independent from each other.

The independence of saturation operation instructions from operation instructions reduces the number of instructions considerably compared to the case where an operation instruction extended with the saturation operation function is newly defined for each type of the operation instruction.

Note that while in the present embodiment, two kinds of data lengths, namely 16 bits and 24 bits, are used for rounding off, any integers may be set as the upper-most value and lower-most value as for as the upper-most value is greater than the lower-most value.

In the present embodiment, an integer with a sign is used for each of the upper-most value, the lower-most value, and the first operand of the saturation operation instruction used for the comparison with these values. However, an integer without sign can be used instead. For example, 32-bit integers without sign 0x0000FFFF and 0x00000000 can be used respectively as the upper-most value and lower-most value. The same saturation operation can be achieved if such values are used. Also, different data lengths may be used as well as 16 bits and 24 bits.

In the present embodiment, the saturation operation instruction includes one operand. However, the saturation operation instruction may include two operands. In this case, the correction result may be stored in a register specified by one of the two operands.

<Second Embodiment>

Figure 14:
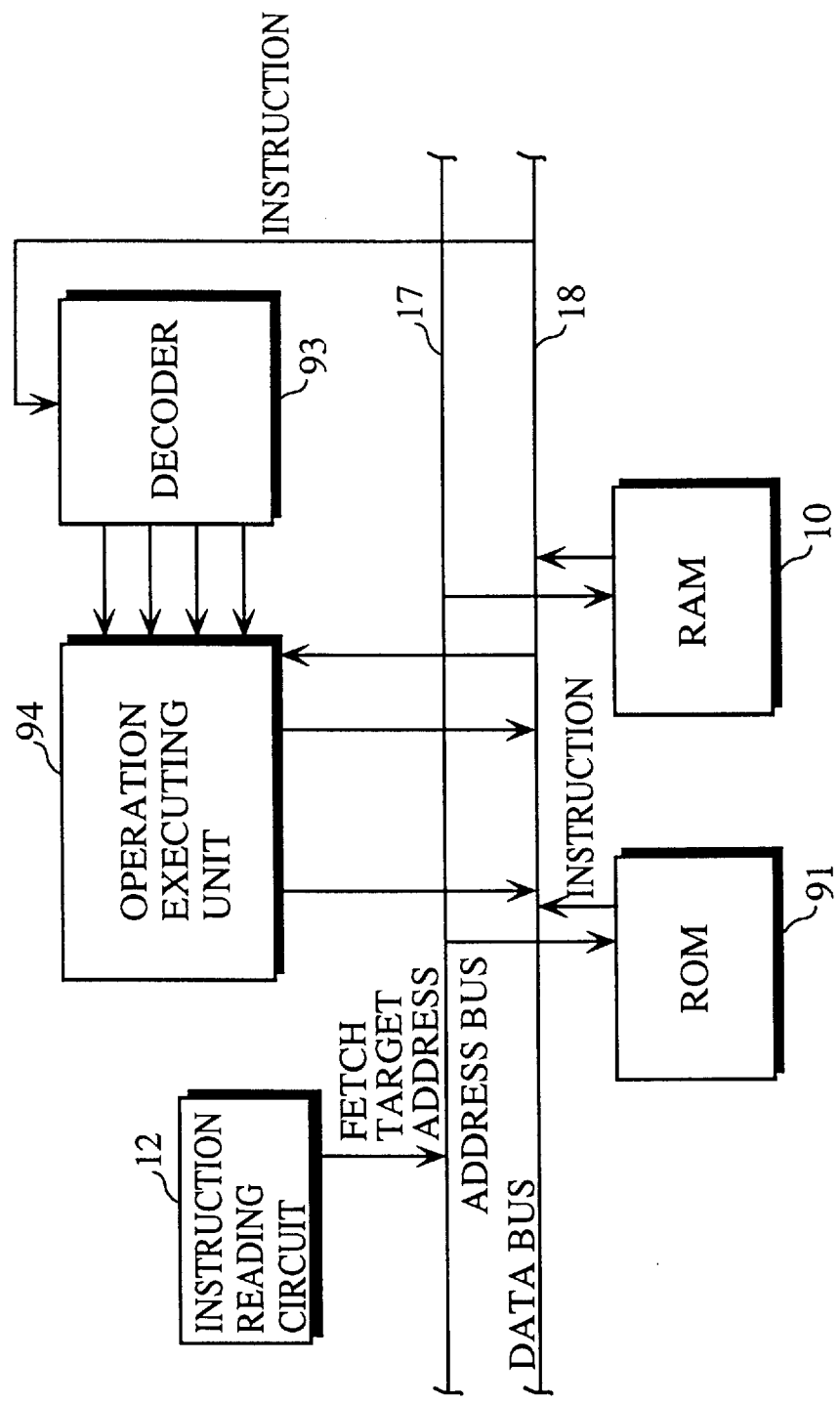
FIG. 14 shows the construction of the processor with saturation operation function described in the second embodiment.

FIG. 14 shows the construction of the processor used in the second embodiment. As shown in the drawing, the processor includes RAM 10, instruction reading circuit 12, ROM 91, decoder 93, and operation executing unit 94.

ROM 91 differs from ROM 11 in that it prestores instructions including saturation operation instructions which can specify 32-bit data length. That is, the saturation operation range field of the saturation operation instructions may have the following specifications: "00" specifying "16 bits;" "01" 24 bits; and "10" 32 bits.

Decoder 93 differs from decoder 13 in that, under control (3), decoder 93 can instruct operation executing unit 94 to generate the upper-most value and lower-most value of 32 bits as well as 16 bits and 24 bits if "32 bits" is specified in the operation range field of the saturation operation instruction.

Figure 15:
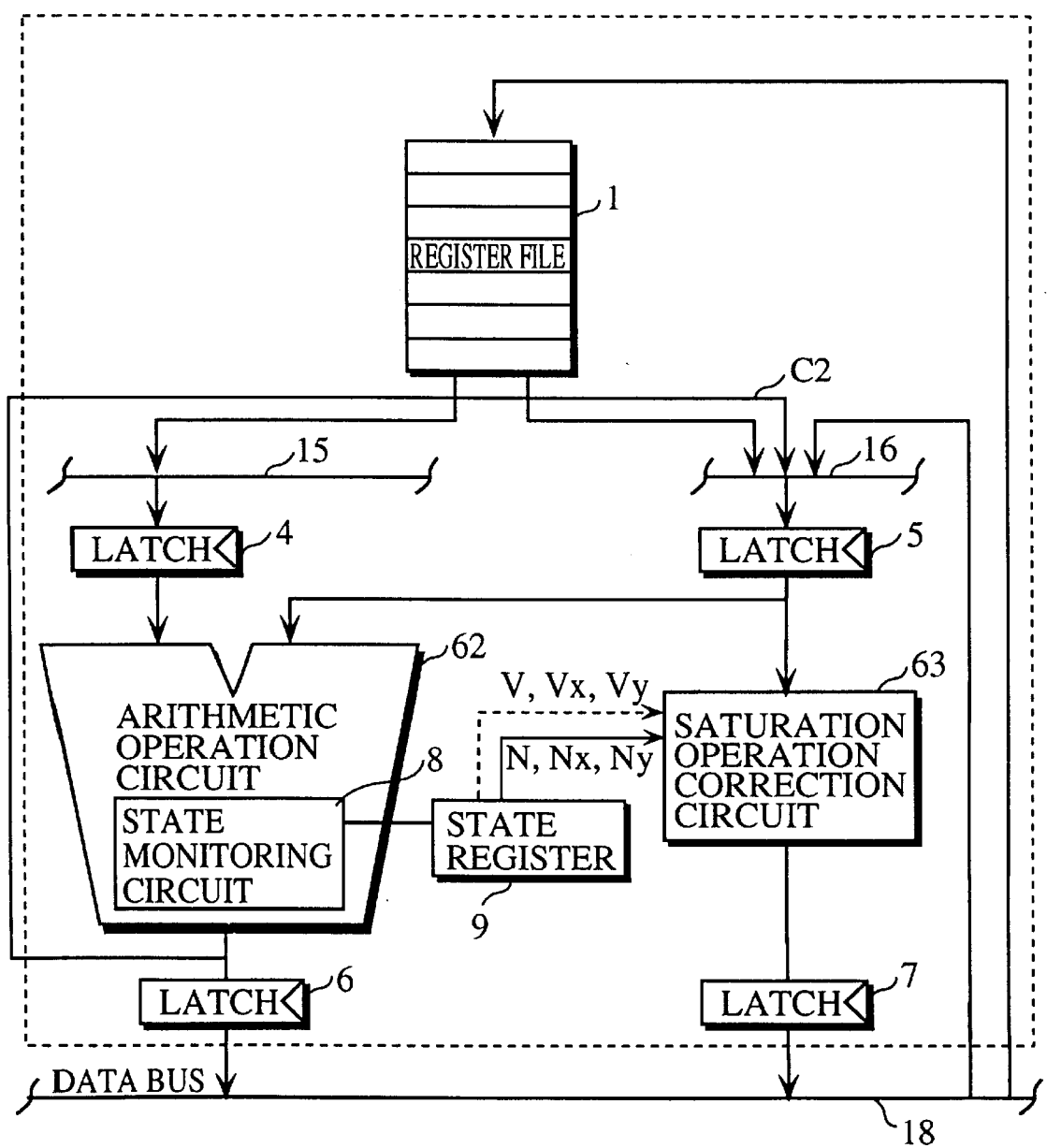
FIG. 15 shows the construction of operation executing unit 94 described in the second embodiment.

FIG. 15 shows the construction of operation executing unit 94. As shown in the drawing, operation executing unit 94 includes register file 1, latch circuits 4, 5, 6, and 7, arithmetic operation circuit 62, saturation operation correction circuit 63, state register 9, internal bus 15, and internal bus 16. The components with the some numbers are the same as those in the first embodiment.

Arithmetic operation circuit 62 is the same as arithmetic operation circuit 2 except that it includes state monitoring circuit 8. State monitoring circuit 8 monitors the operation performed by arithmetic operation circuit 2. Particularly, the following items monitored by state monitoring circuit 8 are related to the second embodiment: (1) overflow; (2) carry; and (3) sign bit.

In the overflow monitoring, state monitoring circuit 8 monitors whether an overflow exceeding the MSB has occurred. There are three kinds of MSBs in the present embodiment, namely MSBs for 32 bits, 24 bits, and 16 bits.

In the carry monitoring, state monitoring circuit 8 monitors whether a carry reaching the MSB has occurred. In the sign bit monitoring, state monitoring circuit 8 monitors whether the MSB has reversed to negative.

Figure 16:
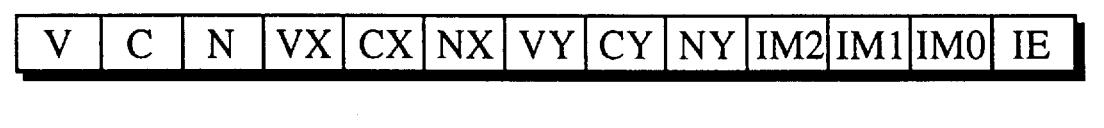

State register 9 indicates, for each data length, whether an overflow, carry, or sign reversion has occurred. State register 9 also indicates the mask level of an interrupt and whether to allow reception of a key interrupt. FIG. 16 shows the construction of state register 9. As shown in the drawing, state register 9 is made up of flags V, C, N, VX, CX, NX, VY, CY, NY, IM2, IM1, IM0, and IE.

Flag V indicates whether an overflow has occurred in an operation result of 32-bit data length.

Flag C indicates whether a carry has occurred at the 32nd bit of an operation result of 32-bit data length.

Flag N indicates whether the sign of an operation result of 32-bit data length is positive or negative.

Flag VX indicates whether an overflow has occurred in an operation result of 24-bit data length.

Flag CX indicates whether a carry has occurred at the 24th bit of an operation result of 24-bit date length.

Flag NX indicates whether the sign of an operation result of 24-bit data length is positive or negative.

Flag VY indicates whether an overflow has occurred in an operation result of 16-bit data length.

Flag CY indicates whether a carry has occurred at the 16th bit of an operation result of 16-bit data length.

Flag NY indicates whether the sign of an operation result of 16-bit data length is positive or negative.

Flags IM2–0 (Interrupt Mask Flags) indicate respectively the mask levels of interrupts.

Flag IE indicates whether to allow reception of a key interrupt (interrupt enable).

Figure 17:
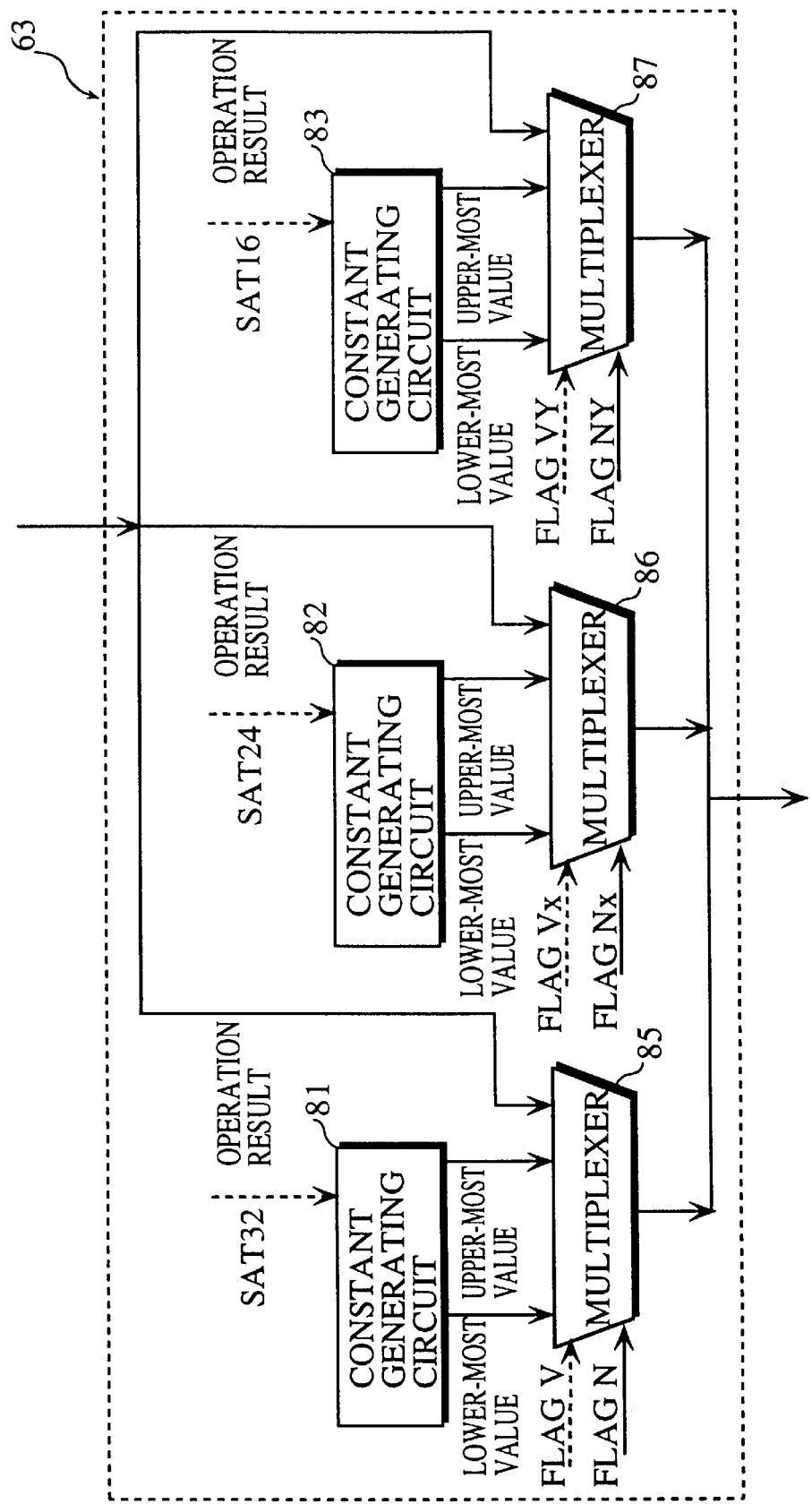
FIG. 17 shows the construction of the saturation operation correction circuit described in the second embodiment.

Saturation operation correction circuit 63 has a feature in common to Saturation operation correction circuit 3 that arithmetic operation circuit 62 and saturation operation correction circuit 63 are connected in parallel to register file 1 and the data bus. FIG. 17 shows the construction of saturation operation correction circuit 63. As shown in the drawing, saturation operation correction circuit 63 is made up of constant generating circuits 81, 82, and 83 and multiplexers 85, 86, and 87.

Constant generating circuit 81 generates the upper-most value and lower-most value of 32-bit operation range if "32 bits" is specified as the operation range under control (3). The upper-most value and lower-most value are respectively 32-bit integers with a sign 0x7FFFFFFF and 0x80000000.

Constant generating circuit 82 generates the upper-most value and lower-most value of 24-bit operation range if "24 bits" is specified as the operation range under control (3). The upper-most value and lower-most value are respectively 32-bit integers with a sign 0x007FFFFF and 0x00800000.

Constant generating circuit 83 generates the upper-most value and lower-most value of 16-bit operation range if "16 bits" is specified as the operation range under control (3). The upper-most value and lower-most value are respectively 32-bit integers with a sign 0x00007FFF and 0x00008000.

Multiplexer 85 selectively outputs any of the upper-most value 0x7FFFFFFF, the lower-most value 0x80000000, and a register-file-1 value held in latch circuit 5 according to the combination of values set in flag V and flag N.

FIG. 18 is the truth table showing the relation between the combinations of flag V values and flag N values and the values output from multiplexer 85.

The table shows that if "1" is set as flag V value and "0" as flag N value, multiplexer 85 outputs the upper-most value generated by constant generating circuit 81.

If "1" is set as flag V value and "1" as flag N value, multiplexer 85 outputs the lower-most value generated by constant generating circuit 81.

If "0" is set as flag V value and "0" or "1" as flag N value, multiplexer 85 outputs the operation result held in latch circuit 5.

Multiplexer 96 selectively outputs any of the upper-most value 0x007FFFFF, the lower-most value 0x00800000, and a register-file-1 value held in latch circuit 5 according to the combination of values set in flag V and flag N.

Multiplexer 87 selectively outputs any of the upper-most value 0x00007FFF, the lower-most value 0x00008000, and a register-file-1 value held in latch circuit 5 according to the combination of values set in flag V and flag N.

With such a construction, the present processor can monitor internal state changes such as overflows, carries, and sign reversions that occur with operations by arithmetic operation circuit 62 and perform saturation operations corresponding to the internal state changes.

As understood from the above description, the saturation operation process generates no delay in storing the operation result in a register This is because the saturation operation is performed by saturation operation correction circuit 63 which is parallel with arithmetic operation circuit 62 and because arithmetic operation circuit 62 is not set between the output stage of saturation operation correction circuit 3 and the register. Since arithmetic operation circuit 62 and saturation operation correction circuit 63 are connected in parallel to the critical path, the clock signal cycle can be determined based on either longer one of times T3 and T4, where time T3 represents the time period during which arithmetic operation circuit 62 performs an operation and stores the result in the register, and time T4 the time period during which saturation operation correction circuit 63 performs an operation and stores the result in the register. Therefore, implementation of saturation operation correction circuit 63 does not sacrifice the processor speed.

In the present embodiment, an overflow is detected by checking the MSB. However, it is possible to detect an overflow by setting an arbitrary bit as the check bit for the overflow and set respective upper-most values and lower-most values.

For example, it is possible to achieve 16-bit saturation operations in the same way by setting the 16th bit from the LSB (Least Significant Bit) as the check bit for the overflow and setting 32-bit integer with a sign 0x00007FFF as the upper-most value and 32-bit integer with a sign 0xFFFF8000 as the lower-most value.

If instruction "SAT16" is also used as well as instruction "SAT32" shown in the present embodiment for achieving the above feature, only two instructions are used in total. That means the number of instructions has been reduced considerably compared to the conventional technique that uses as many instructions as the number of operation instruction types multiplied by the number of bit length types for saturation processing.

In the present embodiment, an integer with a sign is used for each of the upper-most value and the lower-most value. However, an integer without sign can be used instead. For example, the arithmetic operation circuit may set a "carry bit" and output an operation result if a carry occurs at the MSB of the operation result; reset a "carry bit" and output an operation result if a carry does not occur. The arithmetic operation circuit may set an "addition bit" and output an operation result if the operation is an addition; reset an "addition bit" and output an operation result if the operation is a subtraction. State register 9 may hold flags C and A which respectively indicate the state of the carry bit and addition bit. A 32-bit integer with a sign 0xFFFFFFFF may be set at the upper-most value, and 32-bit integer with a sign 0x00000000 as the lower-most value. The multiplexer may select the above upper-most value if both flags C and A are set; select the above lower-most value if flag C is set and flag A is reset; and select the first operand if flag C is reset, regardless of the state of flag A.

In the present embodiment, the saturation operation instruction includes one operand. However, the saturation operation instruction may include two operands. In this case, the correction result may be stored in a register specified by one of the two operands.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor for sequentially executing instructions in synchronization with a clock signal showing a cycle of time period t1, the processor comprising:

a first bus;

a second bus;

a third bus;

a decoder for decoding an instruction which is either of an arithmetic operation instruction and a saturation operation instruction, and outputting a value used as an operand of the decoded instruction to the first bus and/or the second bus;

an arithmetic operation unit, including an input port connected to the first bus and the second bus and an output port connected to the second bus and the third bus, for fetching the value output by the decoder through the input port when the decoder decodes an arithmetic operation instruction, performing an operation using the fetched value as an operand within a time period t2, and outputting an operation result to the second bus and the third bus through the output port; and a saturation operation unit, including an input port connected to the second bus and an output port connected to the third bus, for fetching the value output by the decoder through the input port when the decoder decodes a saturation operation instruction, rounding off the fetched value to a value in a predetermined range within a time period t3, and outputting the rounded-off value to the third bus through the output port, wherein the time periods t1, t2, and t3 have relationships as shown in Formulae 1 and 2 below:

$t2 \leq t1 < t2+t3$:        Formula 1

$t3 \leq t1 < t2+t3$.        Formula 2

2. The processor of claim 1, wherein the arithmetic operation unit performs an operation with an integer with a sign, and the saturation operation instruction includes the predetermined range, and wherein the decoder includes:

an identifying unit for identifying the predetermined range included in the saturation operation instruction, wherein the saturation operation unit includes:

a constant generating unit for generating an upper-most value of the identified predetermined range;

a comparator for comparing the operation result of the arithmetic operation unit with the upper-most value; and an outputting unit for outputting the upper-most value to the third bus through the output port if the operation result exceeds the upper-most value.

3. The processor of claim 2, wherein the arithmetic operation unit performs an operation with a 32-bit integer with a sign, the identifying unit judges whether the predetermined range is represented by one of a 24-bit integer with a sign and a 16-bit integer with a sign, and the constant generating unit generates an upper-most value for the 24-bit integer with a sign if the identifying unit judges that the predetermined range is represented by the 24-bit integer with a sign and generates an upper-most value for the 16-bit integer with a sign if the identifying unit judges that the predetermined range is represented by the 16-bit integer with a sign.

4. The processor of claim 1, wherein the arithmetic operation unit performs an operation with an integer with a sign, and the saturation operation instruction includes the predetermined range, and wherein the decoder includes:

an identifying unit for identifying the predetermined range included in the saturation operation instruction, wherein the saturation operation unit includes:

a constant generating unit for generating a lower-most value of the identified predetermined range;

a comparator for comparing the operation result of the arithmetic operation unit with the lower-most value; and an outputting unit for outputting the lower-most value to the third bus through the output port if the operation result exceeds the lower most value.

5. The processor of claim 4, wherein the arithmetic operation unit performs an operation with a 32-bit integer with a sign, the identifying unit judges whether the predetermined range is represented by one of a 24-bit integer with a sign and a 16-bit integer with a sign, and the constant generating unit generates a lower-most value for the 24-bit integer with a sign if the identifying unit judges that the predetermined range is represented by the 24-bit integer with a sign and generates a lower-most value for the 16-bit integer with a sign if the identifying unit judges that the predetermined range is represented by the 16-bit integer with a sign.

6. The processor of claim 1, wherein the arithmetic operation unit performs an operation with an integer with a sign, and the saturation operation instruction includes the predetermined range, and wherein the decoder includes:

an identifying unit for identifying the predetermined range included in the saturation operation instruction, wherein the saturation operation unit includes:

a constant generating unit for generating an upper-most value and a lower-most value of the identified predetermined range;

a comparator for comparing the operation result of the arithmetic operation unit with the upper-most value and the lower most value; and an outputting unit for outputting the upper-most value to the third bus through the output port if the operation result exceeds the upper-most value and for outputting the lower-most value to the third bus through the output port if the operation result exceeds the lower-most value.

7. The processor of claim 6, wherein the arithmetic operation unit performs an operation with a 32 bit integer with a sign, the identifying unit judges whether the predetermined range is represented by one of a 24-bit integer with a sign and a 16-bit integer with a sign, and the constant generating unit generates an upper-most value and a lower-most value for the 24-bit integer with a sign if the identifying unit judges that the predetermined range is represented by the 24-bit integer with a sign and generates an upper-most value and a lower-most value for the 16-bit integer with a sign if the identifying unit judges that the predetermined range is represented by the 16-bit integer with a sign.

8. The processor of claim 1, wherein the arithmetic operation unit performs an operation with an integer without a sign, and the saturation operation instruction includes the predetermined range, and wherein the decoder includes:
  an identifying unit for identifying the predetermined range included in the saturation operation instruction, wherein
  the saturation operation unit includes:
    a constant generating unit for generating an upper-most value of the identified predetermined range;
    a comparator for comparing the operation result of the arithmetic operation unit with the upper-most value; and
    an outputting unit for outputting the upper-most value to the third bus through the output port if the operation result exceeds the upper-most value.

9. The processor of claim 8, wherein the arithmetic operation unit performs an operation with a 32-bit integer without a sign, the identifying unit judges whether the predetermined range is represented by one of a 24-bit integer with a sign and a 16-bit integer with a sign, and the constant generating unit generates an upper-most value for the 24-bit integer without a sign if the identifying unit judges that the predetermined range is represented by the 24-bit integer with a sign and generates an upper most value for the 16-bit integer without a sign if the identifying unit judges that the predetermined range is represented by the 16-bit integer with a sign.

10. The processor of claim 1 further comprising:

an overflow flag for being set if an overflow occurs to the operation result of the arithmetic operation unit and for being reset if an overflow does not occur to the operation result, wherein the arithmetic operation unit performs an operation with an integer with a sign, wherein the saturation operation unit includes:
  a monitoring unit for judging whether the value output to the second bus exceeds the predetermined range by monitoring whether the overflow flag has been set.

11. The processor of claim 10 further comprising:

a negative flag for being set if the operation result is negative and for being reset if the operation result is positive, wherein the monitoring unit includes:
  a judging unit for judging whether the value output to the second bus exceeds either of the upper-most value and the lower-most value by monitoring whether the negative flag has been set.

12. The processor of claim 1 further comprising:

a carry flag for being set if a carry occurs to a certain bit of the operation and for being reset if a carry does not occur to the certain bit of the operation by the arithmetic operation unit, wherein the arithmetic operation unit performs an operation with an integer with a sign, wherein the saturation operation unit includes:
  a monitoring unit for judging whether the value output to the second bus exceeds the predetermined range by monitoring whether the carry flag has been set.

13. The processor of claim 12 further comprising:

a negative flag for being set if the operation result is negative and for being reset if the operation result is positive, wherein the monitoring unit includes:
  a judging unit for judging whether the value output to the second bus exceeds either of the upper-most value and the lower-most value by monitoring whether the negative flag has been set.

14. The processor of claim 1 further comprising:

a carry flag for being set if a carry occurs to a certain bit of the operation by the arithmetic operation unit and for being reset if a carry does not occur to the certain bit of the operation, wherein the arithmetic operation unit performs an operation with integers without sign stored in a plurality of registers, wherein the saturation operation unit includes:
  a monitoring unit for judging whether the value output to the second bus exceeds the predetermined range by monitoring whether the carry flag has been set.

15. A control method for controlling a processor comprising a register file, an arithmetic operation unit, and a saturation operation unit, the control method comprising:

a first step in which the arithmetic operation unit performs an operation using one or more values, as operands, stored in the register file and stores an operation result in the register file; and a second step in which the saturation operation unit rounds off a value stored in the register file to a value in a predetermined range, and stores the rounded-off value in the register file.

16. A processor comprising:

a decoder for decoding an instruction which is either of an arithmetic operation instruction and a saturation operation instruction, and outputting a value used as an operand of the decoded instruction;

an arithmetic operation unit arranged to receive the value output by the decoder when the decoder decodes an arithmetic operation instruction, the arithmetic operation unit performing an operation using the fetched value as an operand and outputting an operation result; and a saturation operation unit arranged to receive the value output by the decoder when the decoder decodes a saturation operation instruction, the saturation operation unit rounding off and outputting the rounded-off value.

* * * * *